UNITED STATES PATENT OFFICE.

WILLIAM WILSON LEE, OF NORTHAMPTON, MASSACHUSETTS.

ART OF WELDING.

SPECIFICATION forming part of Letters Patent No. 402,947, dated May 7, 1889.

Application filed October 20, 1888. Serial No. 288,694. (No specimens.)

*To all whom it may concern:*

Be it known that I, WILLIAM WILSON LEE, of Northampton, in the county of Hampshire and State of Massachusetts, have invented a new and useful Improvement in the Art of Welding, as fully set forth hereinafter.

My invention consists in applying borax in solution to metal which is to be welded, the object of my invention being to effect more perfect welding and to eliminate the imperfections, especially the bubble-like specks, that appear on the welded metal when powdered borax or similar flux has been used.

It is well-known to all skilled in the art when powdered borax is applied to the pieces of metal to be welded together imperfections, which may be fairly called "blotches," appear in the welded metal, and these imperfections are highly objectionable in the minor grades of work—for example, in welded handle and blade blanks for table-knives, which should be free from all defects in order to take plating in the best manner, and which, moreover, require to be smooth and highly finished to suit the demands of purchasers. I have discovered that by applying borax in solution to pieces of metal to be welded a greatly-improved weld is produced and the objections referred to are almost wholly avoided.

In practicing my invention I dip the pieces to be welded in a strong solution of borax and water, whereby a very uniform film of borax is formed on the pieces to be welded.

I have no particular rule for making the solution, but usually make it a strong solution, dissolving a sufficient quantity of borax in a tub of water for that purpose; but all this will be readily understood by all skilled in the art without particular description.

What I claim is—

The herein-described improvement in the art of welding, which consists in applying borax in solution to metal to be welded.

WILLIAM WILSON LEE.

Witnesses:
 EDWARD S. BEACH,
 JOHN R. SNOWS.